March 12, 1963  G. B. RICE  3,080,842
PLATED SOLDERING IRON TIP AND METHOD OF PLATING THE SAME
Filed Nov. 17, 1958
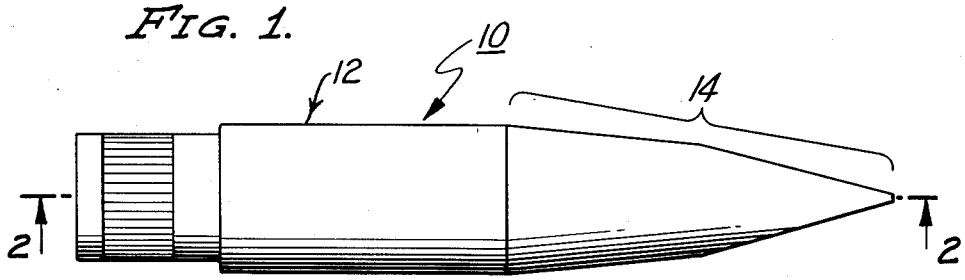
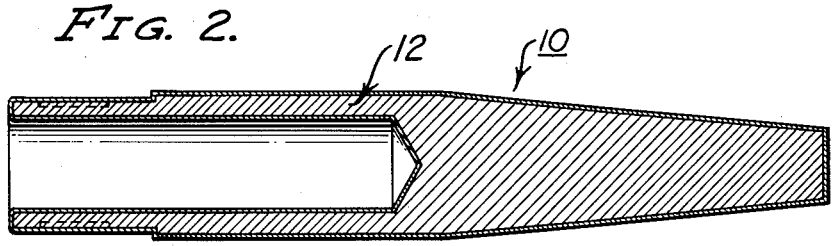
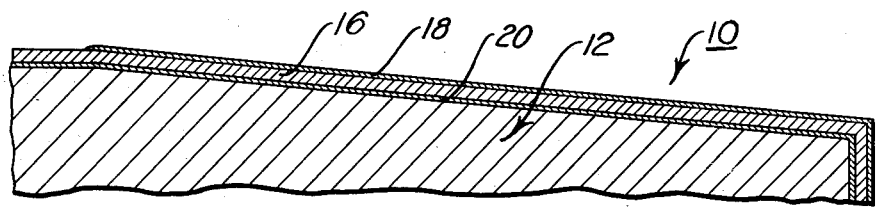
INVENTOR
GERALD B. RICE
BY HIS ATTORNEYS
HARRIS, KIECH, FOSTER & HARRIS 3,080,842
PLATED SOLDERING IRON TIP AND METHOD
OF PLATING THE SAME
Gerald B. Rice, Burbank, Calif., assignor to Surface Alloys Engineering Company, Huntington Park, Calif., a corporation of California
Filed Nov. 17, 1958, Ser. No. 774,411
13 Claims. (Cl. 113—105)

The present invention relates generally to the soldering art and more particularly to a novel plated soldering iron tip and to the method of plating the same.

Very briefly, the invention comprises plating substantially the entire soldering tip with a hard tungsten alloy and then overplating only the working end portion thereof with a thin layer of a solder-wettable element.

As is well known in the art, the conventional soldering iron tips made of copper are not completely satisfactory in that they are subject to serious corrosion problems after a relatively short life. Furthermore, in those soldering irons where the tip is embedded in a ceramic sleeve or a small replaceable tip is threaded into a larger tip element, the soldering flux (which causes corrosion) tends to enter into the joints and cause a cracking of the ceramic sleeve or a general spalling of the joints.

To overcome these deficiencies, some manufacturers have plated the tip with a solder-wettable element such as iron. This plate is normally relatively thick, i.e., in the order of .010 to .015 of an inch, and results in a relatively large heat loss which is particularly undesirable at low wattage. Also, in conventional copper tips and iron-plated ones, the base copper or the iron plate tends to flake and spall and to fall into the joint which is being soldered, thereby contaminating and weakening it.

It is an object of the present invention, therefore, to provide a novel soldering iron tip which has a useful life of at least several times that of the conventional copper tip. More particularly, it is an object to provide a novel plated soldering iron tip which has the increased life advantages obtained with an iron-plated tip but without the accompanying heat loss disadvantages thereof.

Another object is to provide a novel soldering iron tip which can be made either solder-wettable or non-wettable. More particularly, it is an object to provide a long-life non-wettable tip which can be used for desoldering joints, or which can be made solder-wettable by merely overplating a portion of the tip.

Yet another object is to provide a lightweight plated soldering iron tip which has all of the advantages of a plated copper tip, plus the additional advantage of being relatively light in weight.

Another object is to provide a novel method for plating a copper tip. More particularly, another object is to provide a novel method for plating a tungsten alloy on a nonferrous soldering iron tip, and for overplating the working end portion thereof with a solder-wettable substance.

Further objects and advantages of the present invention will be readily apparent from the detailed description which follows, reference being had to the accompanying drawing wherein a preferred embodiment of the present invention is shown.

In the drawings:

FIG. 1 is a top plan view of a soldering iron tip embodying the teachings of the present invention;

FIG. 2 is a vertical sectional view taken on the line 2—2 in FIG. 1; and

FIG. 3 is an enlarged fragmentary portion of FIG. 2 in which the various layers of metal are enlarged out of proportion.

Referring to the drawing more particularly by reference numerals, the numeral 10 indicates a soldering iron tip constructed and plated in accordance with the teachings of the present invention.

The tip 10 is preferably made of copper and includes a body portion 12 and a working portion 14 which is eventually tinned prior to use. In some instances the tip may include a body portion and a removable tiplet which is the actual working portion.

I have discovered that a long-wearing soldering iron tip with relatively low heat loss can be produced by plating substantially the entire copper body with a thin layer 16 of a hard, nonwettable tungsten alloy, and when the tip is to be used for soldering, by overplating only the working portion 14 with a solder-wettable element 18. Prior to plating a nonferrous material with a tungsten alloy, it is desirable to plate it with a very thin layer of nickel 20, as will be described more fully hereinafter.

A tungsten cobalt alloy for the over-all layer produces the best results but tungsten iron and tungsten nickel can also be used. Insofar as the solder-wettable element is concerned, nickel is preferred, but here again silver, cadmium, tin, copper, or gold can also be used.

The tungsten alloy layer 16 can be from about .0005 to about .010 of an inch in thickness, but the best all around thickness is about .002 of an inch for small tips. The thinner layers will provide adequate resistance against corrosion but are not as satisfactory as the heavier layers insofar as mechanical or abrasive wear is concerned.

I have also discovered that a tungsten alloy containing from about 0.5% to about 50% tungsten will function satisfactorily, but that optimum results are achieved when the tungsten content is in the neighborhood of about 15% to about 30%.

As mentioned hereinabove, if the tip is to be used for desoldering work, no additional plating is required. In like manner if the part is a soldering body which is constructed to receive a soldering tiplet, no additional plating is required. On the other hand, if the body is to be used for soldering, after the entire tip has been plated with a tungsten alloy the working end or working portion thereof (which will eventually be tinned) is overplated with a solder-wettable element selected from the group consisting of nickel, silver, cadmium, tin, copper and gold. This layer is relatively thin and is preferably in the range of about .0002 to about .0003 of an inch thick.

A typical process for producing a tungsten alloy plated copper tip which has a solder-wettable working portion is as follows (1) Clean the part with an alkaline solution, e.g. one containing sodium hydroxide, trisodium phosphate, and sodium carbonate, at a temperature of about 180° F. to about 190° F.

(2) Rinse with cold water.

(3) Nickel strike; preferably in a bath containing thirty-two ounces per gallon of nickel sulfate and sixteen ounces per gallon of hydrochloric acid having a specific gravity of 1.18, for about thirty to forty-five seconds at a temperature range of about 70° to 90° F. and a current density of about 100 to about 150 amperes per square foot. (As mentioned hereinabove, this step can be omitted when tungsten-plating a ferrous material.)

(4) Rinse with cold water.

(5) Tungsten-alloy-plate in a bath and under the conditions set forth below.[1]

---

[1] Inasmuch as the composition of the tungsten alloy which is plated on the tip is dependent upon the temperature of the bath, the current density, and to some degree the composition of the bath itself, it is believed advisable to consider this step of the process separately and in more detail than the other steps. By way of example, a typical plating bath for producing a tungsten-cobalt layer on the tip is set forth in Table A.

(6) Rinse with cold water.

(7) Flash-nickel-plate in a Watts bath. This usually contains forty ounces per gallon of nickel sulfate, six ounces per gallon of nickel chloride, five ounces per gallon of boric acid, and sufficient sulfuric acid to achieve a pH of 2.4. The temperature is preferably in the neighborhood of 130° F. and the current density is about 25 to 45 amperes per square foot.

(8) Rinse with cold water and dry.

Table A

Ingredients: Grams per liter
- a. Cobalt as cobalt chloride or cobalt sulfate -- 25
- b. Tungsten as sodium tungstate -- 25
- c. Rochelle salt -- 400
- d. Ammonium chloride or ammonium sulfate -- 50
- e. Ammonium hydroxide to adjust to desired pH.

As mentioned hereinabove, although the composition of the tungsten alloy which is plated on the tip can be controlled to some extent by the bath, the composition is more readily controlled by other factors such as temperature, pH, and current density. This is illustrated by the information shown in the following Table B in which the one column shows the conditions necessary to achieve a .5% tungsten alloy plating and the other column shows the conditions necessary to achieve a 50% tungsten alloy plating using the bath set forth in Table A.

Table B

| | .5% Tungsten | 50% Tungsten |
|---|---|---|
| Temperature, °C | 55 | 96 |
| pH | 8.3 | 8.7 |
| Current density (amperes per square decimeter) | 2 | 8 |

Reference has also been made to the fact that tungsten nickel and tungsten iron alloys can also be used for plating the soldering iron tip.

A typical plating bath for producing a tungsten nickel layer which contains 25% tungsten and 75% nickel is shown in Table C.

Table C

Ingredients: Grams per liter
- a. Sodium citrate -- 200
- b. Nickel as nickel sulfate -- 15
- c. Tungsten as sodium tungstate -- 65
- d. Ammonium chloride -- 100
- e. Ammonium hydroxide to obtain a pH of 8.5 to 9.0.

Using this bath, the temperature should be maintained at about 90° C. and the current density should be in the neighborhood of about 5 amperes per square decimeter in order to obtain a layer of the aforementioned composition.

A typical plating bath for producing a tungsten iron layer on the tip which contains 45% tungsten and 55% iron is shown in Table D.

Table D

Ingredients: Grams per liter
- a. Citric acid -- 100
- b. Iron as ferrous ammonium sulfate -- 8
- c. Tungsten as sodium tungstate -- 35
- d. Ammonium chloride -- 50
- e. Sufficient ammonium hydroxide to control the pH from between about 8.5 to about 9.0.

When using this bath, the temperature should be in the neighborhood of about 90° C., and the current density should be about 10 amperes per square decimeter.

Thus, it is apparent that there have been provided novel plated soldering iron tips and plating methods which fulfill all of the objects and advantages sought therefor.

Tips coated with a tungsten alloy in accordance with the teachings of the present invention have at least four times the useful life of a conventional iron plated copper tip. Also, soldering irons provided with such a tungsten alloy plating provide about ten percent higher surface temperatures for the same wattage as soldering iron plated with iron. For example, for a 35 watt iron, there is a 50° F. higher surface temperature with the tungsten alloy plate than is obtained with an iron plating, and a 75° F. to 100° F. higher temperature with a 47.5 watt soldering iron.

In addition, when the entire soldering iron tip is plated with a tungsten alloy, there are no problems with cracked ceramic sleeves and spalled joints.

Although the aforementioned description has been directed specifically to the plating of tips made of copper, it is to be understood that the same plating technique can be used with lightweight tips made from aluminum or magnesium. Thus, by using a soldering iron tip of aluminum or magnesium and then plating it with a hard tungsten alloy, one obtains all of the advantages of a plated copper tip, plus the additional advantage of light weight. Obviously a suitable lightweight tip is very important in the electronic industry which employs women on soldering jobs because they tire very quickly when they have to use the heavier soldering iron tips.

It is to be understood that the foregoing description and the accompanying drawing have been given only by way of illustration and example, and that changes and alterations in the present disclosure, which will be readily apparent to one skilled in the art, are contemplated as within the scope of the present invention which is limited only by the claims which follow.

What I claim is:

1. In a soldering iron tip: a body portion and a working end portion of a metal selected from the group consisting of copper, aluminum, and magnesium; a hard nonwettable alloy plating containing from about 0.5% to about 50% tungsten covering substantially the entire tip, said alloy being selected from the group consisting of tungsten cobalt, tungsten iron, and tungsten nickel; and a solder-wettable overplating on the working end portion of the tip, said last named plating being selected from the group consisting of nickel, silver, cadmium, tin, copper and gold.

2. In a soldering iron tip: a body portion and a working end portion of a metal selected from the group consisting of copper, aluminum, and magnesium; and a tungsten cobalt plating covering substantially the entire tip, the plate being from about .005 to about .010 of an inch in thickness and containing from about .5% to about 50% tungsten.

3. In a soldering iron tip: a body portion of a metal selected from the group consisting of copper, aluminum, and magnesium; and a hard nonwettable alloy plating covering substantially the entire body portion, said alloy plating being selected from the group consisting of tungsten cobalt, tungsten iron, and tungsten nickel containing from about 0.5% to about 50% tungsten.

4. In a soldering iron tip: a body portion and a working end portion of a metal selected from the group consisting of copper, aluminum, and magnesium; a tungsten cobalt plating containing from about 0.5% to about 50% tungsten covering substantially the entire tip; and a solder-wettable plating over the tungsten cobalt plate on the working end portion of the tip, said solder-wettable plating being selected from the group consisting of nickel, silver, cadmium, tin, copper, and gold.

5. In a soldering iron tip: a body portion and a working end portion of a metal selected from the group consisting of copper, aluminum, and magnesium; a tungsten iron plating containing from about 0.5% to about 50% tungsten covering substantially the entire tip; and a solder-wettable plating over the tungsten iron plate on the working end portion of the tip, said solder-wettable plating being selected from the group consisting of nickel, silver, cadmium, tin, copper, and gold.

6. In a soldering iron tip: a body portion and a working end portion of a metal selected from the group consisting of copper, aluminum, and magnesium; a tungsten nickel plating containing from about 0.5% to about 50% tungsten covering substantially the entire tip; and a solder-wettable plating over the tungsten nickel plate on the working end portion of the tip, said solder-wettable plating being selected from the group consisting of nickel, silver, cadmium, tin, copper, and gold.

7. In a soldering iron tip: a body portion and a working end portion of a metal selected from the group consisting of copper, aluminum, and magnesium; a tungsten cobalt plating covering substantially the entire tip, the tungsten content thereof being between about 15% and about 30%; and a solder-wettable plating over the tungsten cobalt plate on the working end portion of the tip, said solder-wettable plating being selected from the group consisting of nickel, silver, cadmium, tin, copper, and gold.

8. In a soldering iron tip: a body portion and a working end portion of a metal selected from the group consisting of copper, aluminum, and magnesium; a tungsten cobalt plating containing from about 0.5% to about 50% tungsten covering substantially the entire tip, the plate being between about .005 and about .010 of an inch thick; and a solder-wettable plating over the tungsten cobalt plate on the working end portion of the tip, said solder-wettable plating being selected from the group consisting of nickel, silver, cadmium, tin, copper, and gold.

9. In a soldering iron tip: a body portion and a working end portion of a metal selected from the group consisting of copper, aluminum, and magnesium; a tungsten cobalt plating containing from about 0.5% to about 50% tungsten covering substantially the entire tip, the plate being about .002 of an inch thick; and a solder-wettable plating over the tungsten cobalt plate on the working end portion of the tip, said solder-wettable plating being selected from the group consisting of nickel, silver, cadmium, tin, copper, and gold.

10. In a soldering iron tip: a body portion and a working end portion of a metal selected from the group consisting of copper, aluminum, and magnesium; a tungsten cobalt plating covering substantially the entire tip, the plate being from about .0005 to about .010 of an inch in thickness and containing from about 0.5% to about 50% tungsten; and a solder-wettable overplating on the working end portion of the tip, said last named plating being from about .0002 to about .0003 of an inch in thickness and being selected from the group consisting of nickel, silver, cadmium, tin, copper, and gold.

11. In a soldering iron tip of copper: a body portion and a working end portion; a thin plating of nickel covering substantially the entire tip; and a tungsten cobalt plating containing from about 0.5% to about 50% tungsten over the nickel plate and covering substantially the entire tip.

12. In a soldering iron tip of copper: a body portion and a working end portion; a thin plating of nickel covering substantially the entire tip; a tungsten cobalt plating containing from about 0.5% to about 50% tungsten over the nickel plate and covering substantially the entire tip; and a solder-wettable plating over the tungsten cobalt plate on the working end portion of the tip, said solder-wettable plating being selected from the group consisting of nickel, silver, cadmium, tin, copper, and gold.

13. In a soldering iron tip of copper: a body portion and a working end portion; a thin plating of nickel covering substantially the entire tip; a tungsten cobalt plating containing from about 0.5% to about 50% tungsten over the nickel plate and covering substantially the entire tip; and a nickel plating over the tungsten cobalt plate on the working end portion of the tip.

References Cited in the file of this patent

UNITED STATES PATENTS

| | | |
|---|---|---|
| 1,582,024 | Bagley | Apr. 27, 1926 |
| 1,760,519 | Palmer | May 27, 1930 |
| 1,813,842 | Fink et al. | July 7, 1931 |
| 2,175,899 | Kelly | Oct. 10, 1939 |
| 2,472,296 | Hartnell | June 7, 1949 |
| 2,588,531 | Johnson | Mar. 11, 1952 |

FOREIGN PATENTS

| | | |
|---|---|---|
| 396,676 | Great Britain | 1933 |
| 487,178 | Great Britain | June 16, 1938 |

OTHER REFERENCES

Metals Handbook, published by American Society for Metals, 1948 Ed., page 1114.

UNITED STATES PATENT OFFICE
CERTIFICATE OF CORRECTION

Patent No. 3,080,842 March 12, 1963

Gerald B. Rice

It is hereby certified that error appears in the above numbered patent requiring correction and that the said Letters Patent should read as corrected below.

Column 4, line 54, for ".005" read -- .0005 --.

Signed and sealed this 1st day of October 1963.

(SEAL)
Attest:

ERNEST W. SWIDER

Attesting Officer

DAVID L. LADD

Commissioner of Patents